United States Patent [19]

Kuchenbecker

[11] Patent Number: 4,742,677
[45] Date of Patent: May 10, 1988

[54] CONTROLS FOR HYDROSTATIC DRIVE UNITS

[75] Inventor: Dietrich Kuchenbecker, Aschaffenburg, Fed. Rep. of Germany

[73] Assignee: Linde Aktiengesellschaft, Wiesbaden, Fed. Rep. of Germany

[21] Appl. No.: 28,310

[22] Filed: Mar. 20, 1987

Related U.S. Application Data

[63] Continuation of Ser. No. 651,593, Sep. 18, 1984, abandoned.

[30] Foreign Application Priority Data

Sep. 20, 1983 [DE] Fed. Rep. of Germany ....... 3333876

[51] Int. Cl.$^4$ ............................................ F16H 39/44
[52] U.S. Cl. ........................................ 60/443; 91/519
[58] Field of Search .................. 60/443, 465; 91/497, 91/506, 519

[56] References Cited

U.S. PATENT DOCUMENTS

| | | | |
|---|---|---|---|
| 3,644,063 | 2/1972 | Bosch | 91/506 X |
| 3,669,570 | 6/1972 | Himmler | 91/506 X |
| 3,750,406 | 8/1973 | Verlinde et al. | 60/443 X |
| 3,805,676 | 4/1974 | Hamma et al. | 74/843 X |
| 3,850,272 | 11/1974 | Reineche et al. | 60/445 X |
| 3,947,194 | 3/1976 | Schlecht | 417/212 |
| 4,212,164 | 7/1980 | Young | 60/465 X |
| 4,449,366 | 5/1984 | Sato et al. | 60/465 X |
| 4,476,680 | 10/1984 | Pollman et al. | 60/443 X |

FOREIGN PATENT DOCUMENTS 2823559  6/1979  Fed. Rep. of Germany .

*Primary Examiner*—A. Michael Chambers
*Assistant Examiner*—John C. Fox
*Attorney, Agent, or Firm*—Buell, Ziesenheim, Beck & Alstadt

[57] ABSTRACT

A control for a hydrostatic unit is provided in which control mechanism is provided between the feed line of the hydrostatic unit and a servo piston controlling the drive unit whereby the pressure acting on the servo piston is dependent on the setting of the drive unit in addition to the feed pressure of the drive unit.

5 Claims, 3 Drawing Sheets

4,742,677

CONTROLS FOR HYDROSTATIC DRIVE UNITS

This application is a continuation, of application Ser. No. 651,593, filed 9/18/84, abandoned.

This invention relates to controls for hydrostatic drive units and more particularly to a control for a hydrostatic drive unit, whose final control element is in working connection, either directly or preferably indirectly, e.g., through a servo power amplifier, with a servo piston that is capable of sliding in an operating cylinder and loaded by an arbitrarily adjustable control pressure or one that is dependent on another operating parameter, e.g., the drive r.p.m., and on the other side is capable of sliding against the force of a spring, in which case a force produced by a pressure piston that is capable of sliding in a pressure cylinder loaded by the feed pressure of the drive unit through a line branching from the feed line of the drive unit pump acts on this servo piston.

A device of the type to which this invention is a applicable is known through DE-OS No. 28 23 559 and has proved to be very good. The servo piston is acted upon in such device, for example, by an arbitrarily adjustable control pressure. If this control pressure is increased very rapidly, e.g., in a drive unit with a rotating output shaft by which a machine with a high moment of inertia is driven, a high torque must be applied to accelerate the inert mass and consequently the drive unit high pressure increases and thus acts on the pressure piston, which prevents an excessively rapid change in the setting of the servo piston. The drive unit high pressure is thus prevented from exceeding a boundary value, and the relief valve jet at the drive unit high-pressure line is thus prevented from opening (the energy of the pressure fluid that is under high pressure in front of this valve and flows off through it is annihilated by the opening of the relief-valve jet). If the control pressure only always prevails on the one side and the feed pressure prevails on the other side on the pressure piston of smaller diameter, the result is that the predetermined pressure, which is to a certain extent below the response pressure of the relief-valve jet, can be obtained over the entire adjustment range of the pump, i.e., with any delivery stream. The disadvantage of the device is that, besides the pressure of the pressure piston, the force of a spring also counteracts the control pressure. This spring is required for return if there is no pressure in the drive unit and is above all necessary to achieve a correlation between control pressure and setting as a result of the equilibrium between control pressure and the return force of the spring when it is more or less compressed as a function of the servo piston travel. In order to obtain a stable characteristic curve, the spring force must have a certain minimum value. However, besides the force of the pressure piston, this spring force also influences the setting attained at a certain control pressure, so that a pump set at a high stroke volume per revolution is swung back as a result of the spring force at a lower feed pressure than that which would be admissible with respect to the pressure limitation. This has the result that the maximum acceleration cannot be attained.

The invention proposes to eliminate this shortcoming and to improve a control or regulator of the above type so that a restoration toward a smaller stroke volume also occurs with the adjustment of the pump to a high stroke volume only if the admissible boundary pressure is reached; on the other hand, the characteristic curve and thus the force of the spring are selected so that a good stability is achieved.

This problem is resolved according to the invention in that the force also acting on the servo piston at high feed pressure is independent of the setting of the drive unit, and for this purpose the pressure acting on the pressure piston is dependent on this setting in addition to the feed pressure of the drive unit.

In an expedient embodiment it is provided for this rpose that a restrictor is located in the branch line leading to the pressure cylinder, this line branching off from the feed line of the drive unit, and a drain channel is provided between this restrictor and the end face of the pressure piston. This drain channel contains a second restrictor that is variable as a function of the setting of the servo piston, i.e., of its travel path and thus of the setting of the drive unit and/or of the stroke-volume setting of the pump.

The result is that the perturbing action of the spring if a high pressure prevails in the drive unit is eliminated or the spring force is compensated, while if no feed pressure is present in the drive unit, only the equilibrium sought between the force produced by the control pressure and the force of the more or less compressed spring determines the setting.

In an expedient embodiment the second restrictor is a recess, e.g., slot or groove, whose cross section varies in the longitudinal direction of the piston, located on the periphery of the pressure piston, in which case this recess is connected with a pressureless drain.

Because the feed pressure of the drive unit is considerably higher than the control pressure, the pressure piston is considerably smaller in diameter than the servo piston.

In the foregoing description I have set out certain objects, purposes and advantages of this invention. Other objects, purposes and advantages of the invention will be apparent from a consideration of the following description and the accompanying drawings in which.

Figure 1:
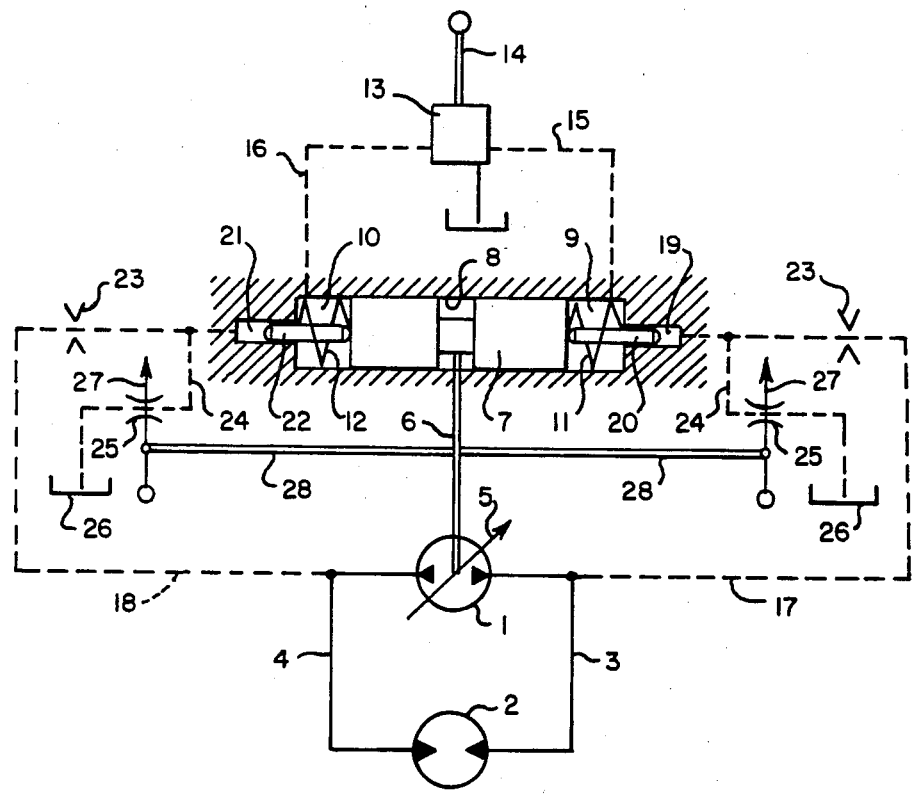
FIG. 1 shows a circuit diagram of a hydrostatic drive incorporating the basic concepts of the invention.

The hydrostatic drive unit consists of a pump 1 and the hydraulic motor 2, where the pump 1 is connected with the hydraulic motor 2 through two feed lines 3 and 4 in closed circuit. The final control element 5 of the pump is connected with the servo piston 7, which is capable of sliding in an operating cylinder 8, through a lever 6 that is represented only symbolically. A pressure chamber 9 or 10 is formed on both sides of the servo piston 7. A spring 11 or 12 is located in each pressure chamber 9 or 10; it rests against one end face of the servo piston 7 and also against the bottom of the cylinder 8.

The control pressure pickoff 13 is arbitrarily adjustable by means of the actuating lever 14 so that a control pressure is built up either in the control pressure line 15, which is connected with the pressure chamber 9, or in the control pressure line 16, which is connected with the pressure chamber 10.

If the actuating lever 14 is swung to the right in the drawing, a pressure is generated in the control pressure line 15 that acts on the end face of the servo piston 7 on the right-hand side in the drawing and shifts it against the force of the spring 12 until an equilibrium is established between the force that produces the control pressure on the end face of the servo piston 7 and the force of the spring 12. Accordingly, the same is true if the actuating lever 14 is swung counterclockwise and a pressure is generated in the control pressure line 16.

A branch line 17 is connected to the feed line 3 and a branch line 18 is connected to the feed line 4. The feed line 17 leads to a pressure cylinder 19, in which a pressure piston 20 is capable of sliding and the branch line 18 leads to a pressure cylinder 21, in which a pressure piston 22 slides. If the actuating lever 14 is swung to the right in the drawing in the manner described and a pressure thus prevails in the control pressure line 15 that shifts the servo piston 7 to the left in the drawing, a pressure prevails in the feed line 4 of the drive unit and propagates through the branch line 18 to the pressure cylinder 21 and in the latter to the end face of the pressure piston 22 and a force is thus generated at the pressure piston 22 that works parallel to the force of the spring 12.

According to the invention, a restrictor 23 is provided in the branch line 17 and another branch line 24 is connected to the branch line 17 between this restrictor 23 and the pressure cylinder 19; it leads through an adjustable restrictor 25 to a pressureless reservoir 26. The final control element 27 of the adjustable restrictor 25 is connected with the servo piston 7 through a working connection 28 that is represented only schematically, so that the restrictor is adjusted to a diameter, which is greater, the farther the servo piston 7 is shifted against the force of the spring 12. A similar device is symmetrically provided on the branch line 18. The restrictors 23 and 25 thus form a throttling chain, whose second restrictor 25 is adjustable as a function of the displacement position of the servo piston 7.

The pressure piston 30, which may be used in place of either of pistons 20 and 22, is provided for displacement in a pressure cylinder, whereby the pressure piston 30 extends into the pressure chamber with its left-hand end in the drawing. Either a pressure determined by the control pressure pickoff prevails in the pressure chamber or it is connected through the control pressure pickoff with a pressureless drain line. The right-hand end of the pressure piston 30 in the drawing thus projects into the pressure cylinder, which is loaded by the feed pressure of the drive unit.

The pressure piston 30 has a longitudinal borehole 31, which is closed off on the side projecting into the pressure cylinder by a stopper 32 and which is connected on the side projecting into the control pressure chamber through at least one transverse borehole 33 with the outer periphery of the pressure piston 30, or with a component of reduced diameter. A wedge-shaped slot 34 is located in the cylindrical outer surface of the pressure piston 30; it is connected through a transverse borehole 35 with the longitudinal borehole 31.

The mode of operation is an follows: because the pressure piston 30 extends into the control pressure chamber 9 with its end face that is not loaded with feed pressure and lies there against the end face of the servo piston 7, the position of the pressure piston 30 is determined by the position of the servo piston 7 and thus the setting of the member of the drive unit. The more the servo piston 7 is shifted against the force of the spring 11, the more the pressure piston 30 is displaced, such that a portion of the slot 35 with a wider free passage cross section is freed and creates a connection from the pressure chamber in the pressure cylinder 19 through the control pressure chamber 9 via the control pressure line 16 to the pressureless drain.

The several switching positions of FIG. 1 are applicable to piston 30 as they are to piston 20. There are thus three switching states. The control pressure transducer 13 may be in the neutral position with the result that both control pressure chamber 10 and 9 are pressureless.

In a first operative position the control pressure transducer 13 is regulated so that the control pressure line 15 and the control pressure chamber 9 are loaded with pressure. In this case the control pressure chamber 10 is relieved of pressure and connected through the line 16 with the tank that is indicated underneath the control pressure transducer 13. In this operating state the pump 1 delivers into the line 4, which is thus under pressure. The pressure in the line 4 communicates through the line 18 with the chamber 21.

In the second operative position the control pressure transducer 13 is switched so that it loads the control pressure chamber 10 with pressure through the control pressure line 16 and relieves the control pressure chamber 9 through the line 15. In this case the pump 1 delivers into the line 3 so that the pressure chamber 19 is loaded with pressure through the line 17.

The restrictors 23 and 25 are a new and important part of the invention, where the opening width of each of the two restrictors 25 is dependent on how far the final control element 6 of the pump 1 is displaced.

In FIG. 1 a piston 22 in the pressure chamber 21 and a piston 20 in the pressure chamber 19 are depicted as being capable of being loaded with delivery pressure.

Figure 2:
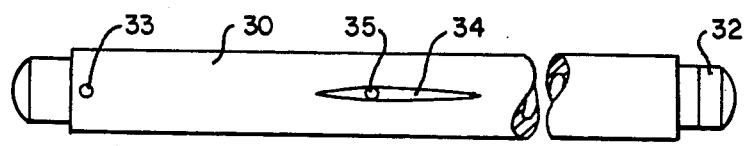
FIG. 2 shows a pressure piston with a recess in side view.
Figure 3:
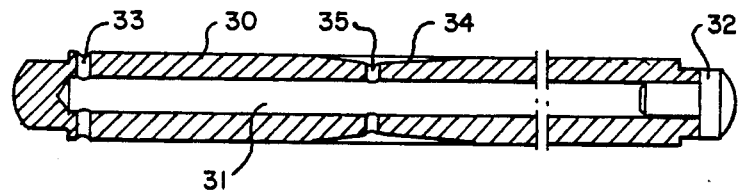
FIG. 3 shows an axial section through the pressure piston according to FIG. 2, where the plane of the cut is perpendicular to the plane of the drawing in FIG. 2.

As pointed out above, FIGS. 2 and 3 shown a design of a piston 30 that takes the place of the piston 20 and in which a restrictor that performs the function of the restrictor 25 is incorporated.

Figure 5:
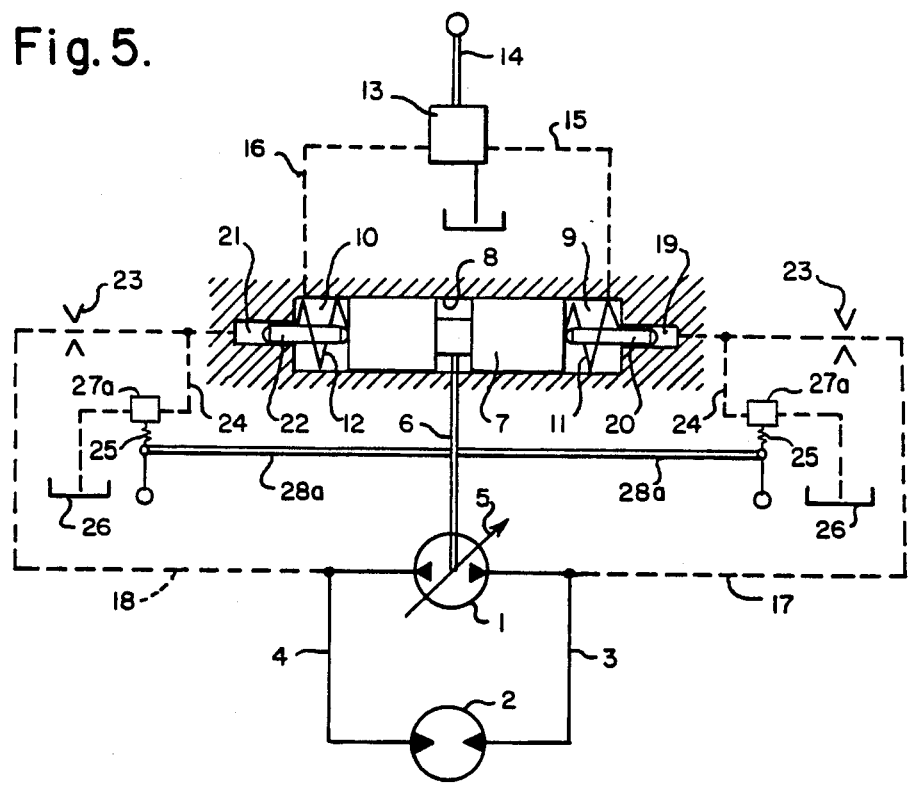
FIG. 5 is a circuit diagram of a second embodiment of a hydrostatic drive incorporating the basic concepts of the invention.
Figure 4:
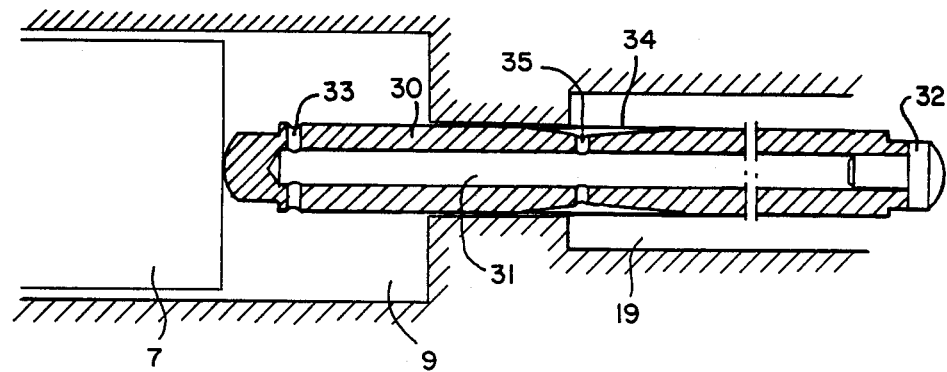
FIG. 4 is a fragmentary section of the housing for the operating cylinder with the sectioned pressure piston of FIG. 3 in place.

The function and structure of piston 30 are more clearly shown in FIGS. 4 and 5. As there illustrated, the boreholes 33, 31 and 35 with the mouth chamber represent a restrictor, which produces a connection between the chamber 19 loaded with delivery pressure and the control pressure chamber 9, or on the other hand produces a connection between the cylindrical space 21 loaded with pressure and the control pressure chamber 10.

It should be noted here that if the cylinder 21 is loaded with delivery pressure, the control pressure chamber 10 is connected through the line 16 and the control pressure transducer 13 with the preessureless container and, vice versa, if the cylinder 19 is loaded with the delivery pressure of the pump 1, the control pressure chamber 9 is connected through the line 15 and the control pressure transducer 13 with the container. A restricted outflow can thus occur on the side on which the cylinder 19 or the cylinder 21 is loaded with the delivery pressure of the pump. It should also be noted that the primary aspect is that the piston 7 connected with the adjusting element 6 of the pump 1 is displaced under the action of the control pressure that prevails either in line 15 or line 16. That is, if the control pressure transducer 13 is switched so that the control pressure line 16 and thus the control pressure space 10 are loaded with pressure, the servo piston 7 and thus the final control element 6 of the pump 1 in FIG. 1 are displaced to the rioght so that the piston 20 or piston 30, as the case may be, loaded with delivery pressure is pressed into the cylinder 19. As can be seen in FIG. 4, the borehole in which the piston 20 and 30 slides in a sealed manner is always made relatively short so as to have to machine only a short stretch. Beyond it, the borehole to the pressure chamber 19 is widened. That is, the psiton 30 shown in FIG. 4 is installed instead of the delivery pressure-loaded piston 20 shown in FIG. 1 and a connection is effected between the pressure chamber 9 and pressure chamber 19 through the boreholes 33, 31 and 35 with the mouth 34, in which case a restrictor whose free passage cross section is dependent on how far the chamber 34 dips into the portion of the borehole that lies close in a selaing manner to the piston 30 is formed at the chamber 34. On the other hand, if the control pressure chamber 9 is loaded with control pressure, the piston 7 is correspondingly shifted to the left in FIG. 1 and either the chamber 19 is quite pressureless, with the result that the piston 30 is shifted to the right under the pressure in the chamber 9 far enough so that the mouth 33 also dips into the sealing portion, and is thus closed off, or a feed pressure that is maintained in line 3 prevails in the chamber 19, with the result that the piston 30 is displaced to the left in FIG. 4 far enough so that the chamber 34 is completely covered by the sealing portion of the borehole and is thus closed off, or the hamber 34 as well as the mouth 33 dips into the chamber 3, such that the same pressure prevails at both boreholes 33 and 35. The chamber 34 thus operates if it acts as a restrictor together with the edge of the narrow borehole, in which the piston 30 is in the sealing state and at which this narrow borehole goes over into the wider, not finely machined borehole. The activity of the servo piston 7 is not influenced by the restrictor because pressure medium flows off through the restrictor 34 only if the control pressure chamber 9 or 10 in connection with it is in any case relieved of pressure through the line 16 or 15, while if the controls pressure chamber 9 or 10 is loaded with pressure, the piston 30 is shifted far enough that either both mouths 33 and 35 empty into the same pressure chamber or at least one of the two is completely closely off.

While it is intended in the embodiment shown in the drawing that an adjustable restrictor 25 be provided in the drain channel 24, it can be provided in another embodiement for a regulating solenoid valve whose setting is a function of the setting of the drive unit, or a relief-valve jet, whose adjustment is a function of the setting of the drive unit to be connected to the drain channel 24.

Figure 6:
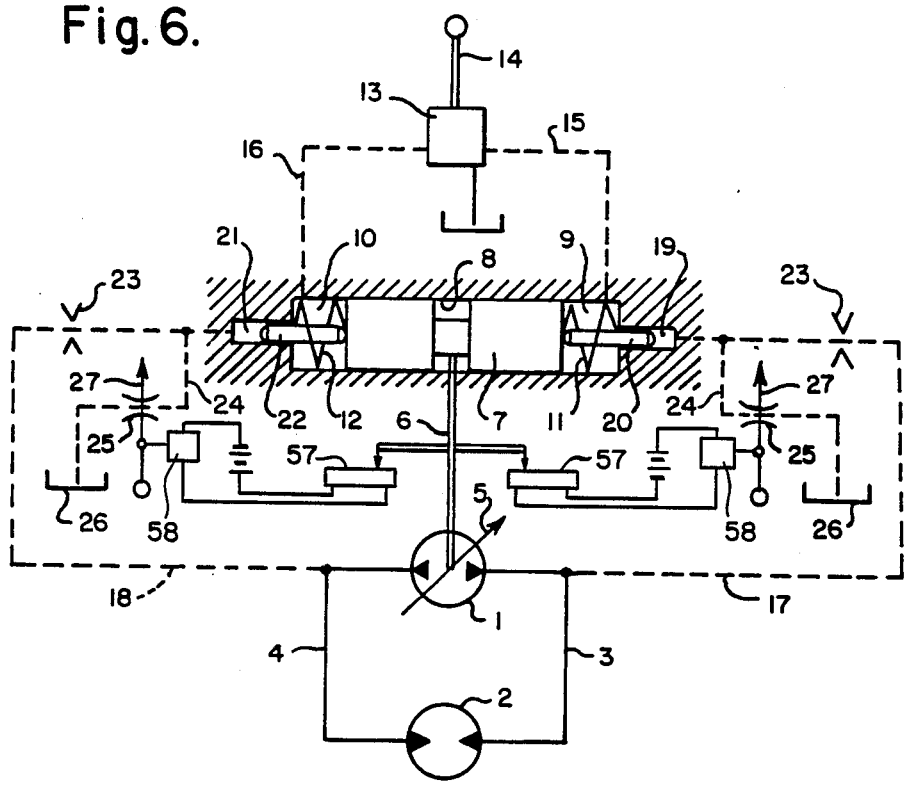
FIG. 6 is a circuit diagram of a third embodiment of a hydrostatic drive incorporating the basic concepts of the invention.

FIG. 6 shows a second embodiment having a pressure limiting valve 27a in the form of a relief valve jet. The limiting pressure is set mechanically by means of rod 28a as a function of the position of the final control element 6 of pump 1.

A third embodiment is shown in FIG. 6 in which an adjustable electrical resistance that is dependent on the position of the final control element 6 of pump 1 is provided. The electrical resistance is connected through a pair of leads to magnet 58, the armature of which is connected with the final control element of the adjustable restrictor 27 which thus acts as a solenoid valve in a well known manner.

In the foregoing specification I have set out certain preferred practices and embodiments of this invention, however, it will be understood that this invention may be otherwise embodied within the scope of the following claims.

I claim:

1. In a control or regulator for a hydrostatic drive unit, having a feed line, a final control element in working connection with a servo piston sliding in an operating cylinder and loaded by a control pressure on one side, a spring on the other side biasing the servo piston toward the control pressure, and a presssure piston, which is capable of sliding in a pressure cylinder loaded by the feed line pressure of the drive unit through a branch line, acting on the servo piston parallel to the force of the spring, the improvement comprising control means in said branch line between the feed line and pressure piston including a variable restrictor whereby the pressure acting on the pressure piston is dependent on the setting of the servo-piston in addition to the feed pressure of the drive unit.

2. Control or regulator according to claim 1, wherien the control means includes a restrictor located in the branch line and a drain channel provided between this restrictor and the pressure piston and at least one additional variable restrictor in said drain channel variable as a function of the setting of the servo piston.

3. Control or regulator according to claim 2, wherein the at least one additional restrictor is a recess located on the periphery of the pressure piston, and the cross section of this recess is different in the longitudinal direction of the piston and said recess is connected with said drain channel.

4. Control or regulator according to claim 1, or 2, or 3 wherein a restrictor is located in the branch line and a drain channel is connected between this restrictor and the pressure piston and a additional restrictor in the form of a solenoid valve, controlled as a function of the setting of the drive unit, is connected to the drain channel.

5. Control or regulutor according to claim 1, or 2, or 3 wherein a restrictor is located in the branch line and a drain channel is connected between this restrictor and the pressure piston and an additional restrictor in the form of a relief valve, jet controlled as a function of the setting of the drive unit, is connected to the drain channel.

* * * * *

UNITED STATES PATENT AND TRADEMARK OFFICE
CERTIFICATE OF CORRECTION

PATENT NO. : 4,742,677
DATED : May 10, 1988
INVENTOR(S) : Dietrich Kuchenbecker

It is certified that error appears in the above-identified patent and that said Letters Patent is hereby corrected as shown below:

Column 2, line 10, change "rpose" to --purpose--.

Column 4, line 1, change "an" to --as--.

Column 4, line 45, change "shown" to --show--.

Column 5, line 9, change "rioght" to --right--.

Column 5, line 24, change "selaing" to --sealing--.

Column 5, line 36, change "hamber" to --chamfer--.

Column 5, line 49, change "controls" to --control--.

Column 5, line 53, change "closely" to --closed--.

Column 6, line 50, change "a" to --an--.

Signed and Sealed this

Seventh Day of March, 1989

Attest:

DONALD J. QUIGG

Attesting Officer

Commissioner of Patents and Trademarks